United States Patent [19]

Zimmerman et al.

[11] Patent Number: 5,419,429
[45] Date of Patent: May 30, 1995

[54] MIXING AND DRINKING BEAKER

[76] Inventors: Johann Zimmerman, Santisweg 10, D-7981 Schlier; Birgit Schoel; Alfred Stellmach, both of Federburgstr. 62, D-88214 Ravensburg, all of Germany

[21] Appl. No.: 162,074

[22] PCT Filed: May 25, 1992

[86] PCT No.: PCT/EP92/01181
§ 371 Date: Dec. 9, 1993
§ 102(e) Date: Dec. 9, 1993

[87] PCT Pub. No.: WO92/22237
PCT Pub. Date: Dec. 23, 1992

[30] Foreign Application Priority Data

Jun. 13, 1991 [DE] Germany .............. 9107332 U
Mar. 25, 1992 [DE] Germany .............. 42 09 718.5

[51] Int. Cl.$^6$ .............................. B65D 25/08
[52] U.S. Cl. ................. 206/222; 215/388; 215/6; 215/229; 215/DIG. 8; 222/80; 220/705
[58] Field of Search .......... 220/703, 705, 80; 215/1 A, 6, 229, DIG. 8

[56] References Cited

U.S. PATENT DOCUMENTS 2,791,467  5/1957  Leshin .
3,820,692  6/1974  Swett et al. .
4,785,931  11/1988  Weir et al. .................. 206/222
4,818,114  4/1989  Ghavi .

FOREIGN PATENT DOCUMENTS 0030187  6/1981  European Pat. Off. .
2118515  4/1982  United Kingdom .
2220930  1/1990  United Kingdom .

Primary Examiner—Joseph Man-Fu Moy
Attorney, Agent, or Firm—Larson and Taylor

[57] ABSTRACT

A mixing and drinking beaker with an adhesive, closing and sealing system between the cover and the beaker and with a chamber in the cover consisting of an outer cover and an inner cover therein after the adhesive and sealing system. The inner cover can be released from its seat without releasing the joint between the cover and the beaker without the need for any additional mechanism simply by the yielding of the sealing seat of the material surrounding the inner cover by pressure from outside axially to the outer cover on the handle and/or the surrounding area of the outer cover. In addition, the adhesive bond between the cover and the beaker can be changed to a positive bond by a shrink strip.

12 Claims, 2 Drawing Sheets

MIXING AND DRINKING BEAKER

FIELD OF THE INVENTION

Mixing and drinking beakers or containers which are used to mix up fluids together with solid, semi-solid and liquid food and also to serve them.

BACKGROUND OF THE INVENTION

There are mixing beakers with screwed covers. With such beakers, the threads disturb the user during drinking and they are also difficult to clean because food remains in these threads. In case of the well-known mixing beakers, before mixing up substances in the beaker, the cover has to be taken off. Driving in a car, it is dangerous to mix up substances, because the content of the beaker can splash out due to vibrations. For long trips where there is no car parking on the highways, it is suggested to drink out of a covered mixing beaker. Also, for the freshness and the taste of the substances to be mixed—the ingredients can build up unwanted compounds if they are influencing each other—it is suggested to mix up the ingredients shortly before drinking. For better mixing, in case of a design for a shaker for baby bottles as disclosed in U.S. Pat. No. 4,818,114, Melinda M. Ghavi, a mixing disk with sharp-edged, radially placed arms is inserted between the bottle and the screwable shaker. This makes the preparation for the mixing process difficult. The invention will relief the deficiencies and over all improve the hygienic conditions for a mixing and drinking cup. It will enable the substances to be mixed to be kept separate until the mixing process, although the beaker is kept closed before the mixing process.

DETAILED DESCRIPTION OF THE PREFERRED EMBODIMENTS

Brief Description

Figure 1:
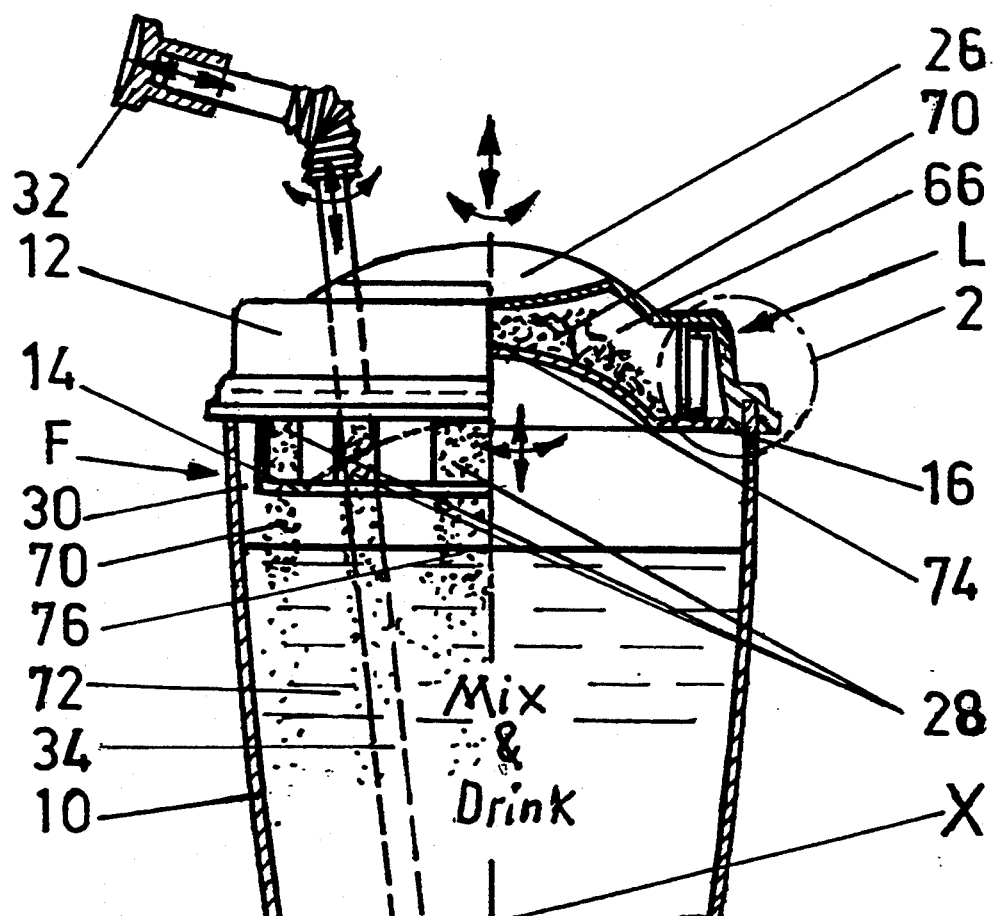
FIG. 1 is a cross-sectional elevation view of a beaker according to the present invention showing different positions of the inner cover on the two lateral sides of the longitudinal axis of the beaker.

Left from the beaker axis X in FIG. 1 is shown the inner cover 14 in opening position F with outflowing food powder 70 which is mixing into the beaker's content or liquid 72.

A drinking pipe 34 passes through the outer cover 12 into the beaker 10 interior. The passing through hole in the outer cover 12 is not shown for clarity.

On the drinking pipe 34, which is not a component of the beaker (because of the cleaning problem the pipe must be exchanged after every use), the cap 32 sits as its lock. The nozzle effect at the nozzles where the powder 70 flows into the beaker 10, when shaking the mixing and drinking beaker 10, is generated through openings 28 and at the gap 30 between the inner cover 14 in the opening position F and the inner surface of the beaker 10 in this zone.

On the right side seen from the mixing and drinking beaker axis X, the chamber 66, formed by the outer cover 12 and the inner cover 14 in a locking position L of the cover, can be seen with the food powder 70 stored there. The inner cover 14, being bulged to the inside of chamber 66, forms a "summit" 74 for the powder 70 in the chamber 66. The sealing/adhering seal 16 is part of the inner cover 14. The handle 26 is in/on the outer cover 12. The arrows indicate the motion possibilities at the elastic/soft outer cover 12. A level mark 76 indicates the maximum liquid 72 level in the beaker 10. A further indication for use of the invented object is the printed sequence "Mix & Drink" on the beaker 10 surface.

Figure 2:
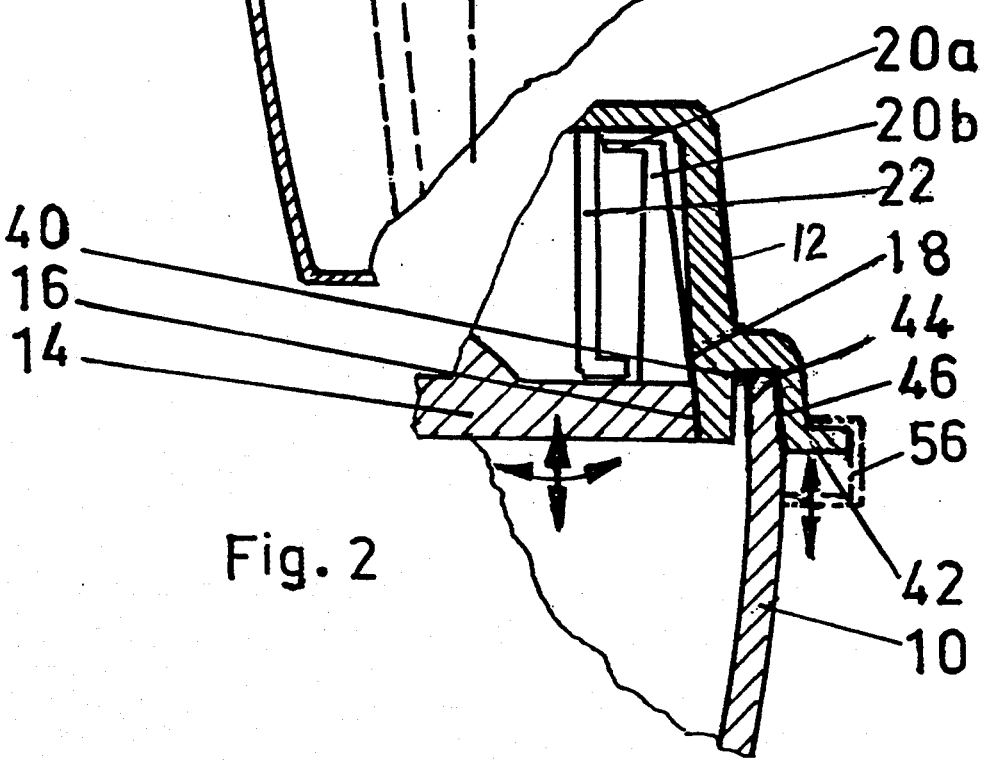
FIG. 2 is an enlarged view of the circled portion of FIG. 1 identified with number 2.

In FIG. 2, a design of a bayonet lock is shown with the elements 22, 20a and 20b. Moreover, this figure represents the co-operation of the "pin" 16 and the "hose" 18 of the invented chamber 66 in the parts 14 and 12. We want to emphasize that the inner cover 14 with its sealing and adhering seat 16 is wound by the outer cover 12 and in this case by its sealing seat 18.

In the representation shown here the "pin" 16 and the "hose" 18 are formed conically. Any other geometrical form of "pin" and "hose" which is appropriate to guarantee the pinning up of the "hose", as well as formations of "pin" and "hose" which cannot be described as geometrical forms, and which is appropriate to generate such a winding force upon the "pin", are potential formations of the invented sealing/adhering system.

Figure 3:
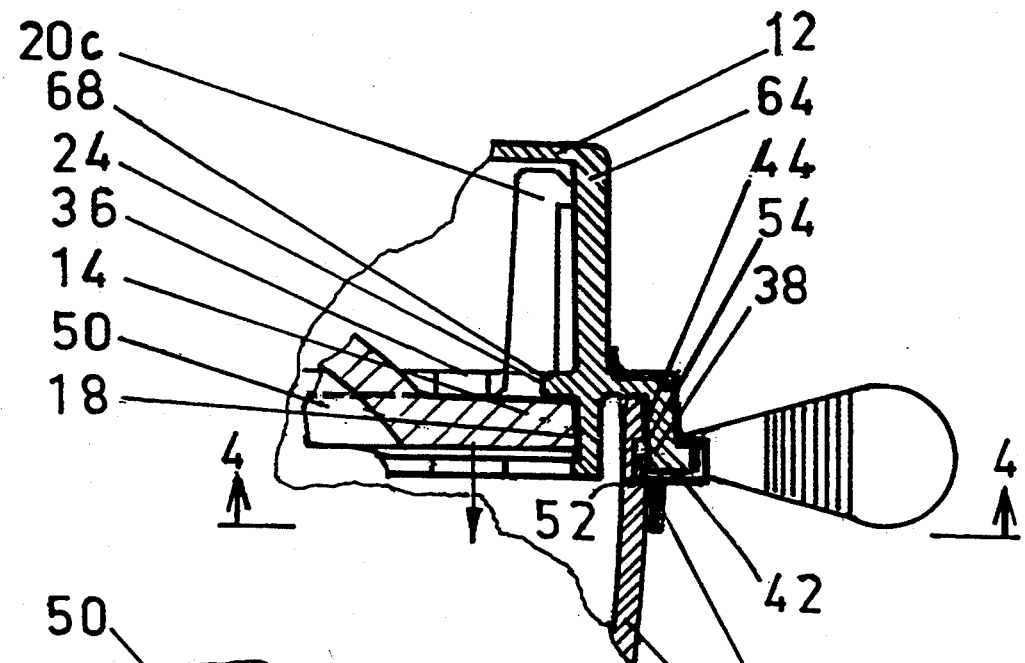
FIG. 3 is an enlarged view of an alternative portion of a beaker similar to that of FIG. 2.
Figure 4:
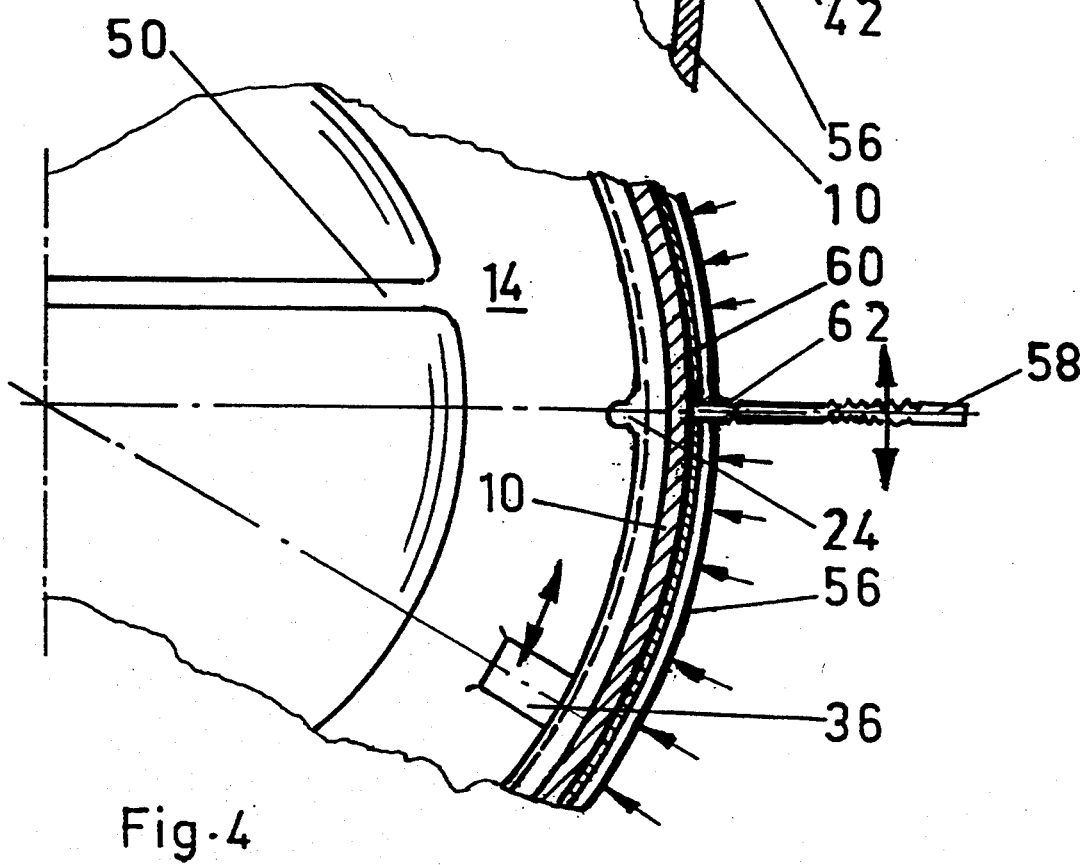
FIG. 4 is bottom cross-sectional view of a portion of the beaker depicted in FIG. 3 taken along the line 4—4 in FIG. 3.

The sealing seat 44, beaker flange 40, shoulder 22 and ring 56 together with the groove 54 in the beaker 10 refer to an alternative tightening/adhering and sealing system shown in FIGS. 3 and 4. The represented design has been manufactured with usual plast-spraying machines, with regard to the inner and the outer cover 12 and 14. Using polyurethane (food compatible composition) with a shore hardness A of about 87, and using a ten times harder and stiffer polymer for the beaker 10, the full operatability of the mixing and drinking beaker, corresponding to description, was achieved. The necessary tolerance band widths for "pins" and "hose", at the demanded winding, tightening and sealing behavior of the invented tightening, adhering and sealing system are so wide that, after adapting the tools for polymer spray-casting on usual plast-spraying machines which can be obtained at the market to the polymers and using the tested polymers in the composition found out by experiments, no difficulties should arise thereby in the mass production of the mixing and drinking beaker parts.

The behavior of the shrinking band 56 at a herefor determined polymer, using a gas flame for shrinking and achieving predetermined shrinking tensions in the band or in the outer cover 12 needs yet more detailed experiments; but the represented form of the shrinking band gives a possibility for its application and effectiveness according to the description.

The shrinking band 56 has the predetermined breaking point 62 and the lap 58 for tearing up the shrinking band 56. The edge/curve 60 at the shrinking band 56 arises during the shrinking process and this edge 60 gets engaged into the beaker groove 54.

The outer cover flange 42 is pressed into the groove 54 during the shrinking process of the shrinking band 56 with its inner peripheral fine rim 38.

More Detailed Description

The mixing and drinking beaker includes the beaker 10 and the cover, consisting of the outer cover 12 and the inner cover 14. Two compartments sealed against each other are formed as the inner cover 14 with its sealing cone 16 fits in the conical sealing seat 18 in the outer cover 12. The inner cover 14 is released from its seat 18 and held in final position F by shoulders 20a and 20b in the FIG. 1 embodiment or shoulder 20c in the FIGS. 3–4 embodiment, and by the shoulders 22 in the FIG. 1 embodiment, or by a rim 24 in the FIGS. 3–4 embodiment on the inner surface of the outer cover 12.

This releasing takes place by pressing with the hand and/or fingers onto the outer cover 12 and especially onto the handle or flange 42 and the moulded in area where it is placed. In the final position F of the inner cover, the openings 28 formed between the shoulders 20b of FIG. 1, or the shoulders 20c of FIGS. 3–4 or more of them, are opened in direction to the side of the beaker 10. The inner cover 14 forms, together with the side of the beaker 10 in the final position F, openings 30 and 28 through which, by shaking the beaker 10, the contents are mixed in the beaker 10 and in between the outer cover 12 and the inner cover 14. As the contents flow out of the chambers 66 into the beaker 10 and in between covers 12 and 14 during shaking, at the (nozzle) openings 28 and 30 the flowing speed thereof will be altered, and the contents, especially by this nozzle effect, are well mixed as is known from electromechanical mixers.

The nozzle effect $E = \frac{1}{2} m v^2$, for a calculated mass of 0.25 kg and a liquid velocity of 2 m/sec, is really high for such a mixing process, corresponding to the energy of 250 g-hammer beat. This mixing process can be supported by pumping motions on the elastical/soft outer cover 12 by pulling/pushing the handle 26. The drink mixed in such a way can be poured out of the beaker after removing the cover 12 or the lock 32 from the drinking pipe 34.

For cleaning, the inner cover 14 can be twisted out of the bayonet lock formed by the shoulders and the interrupted rim. The refitting can take place, in case of the design with rim/rims 24 by pushing the shoulders 20c on the inner cover 14 over the rims of the elastical/soft outer cover 12. For pulling out of the bayonet lock, the inner cover, however, with it shoulder/shoulders 20c must be twisted in such a way that they can go through the groove/grooves 36 in the rim 24. For easier finding, this position is marked by signs on the inner cover 14 and on the flange 38 of the outer cover 12.

Also in case the inner cover 14 is fitted in the bayonet lock, a good cleaning of the inner cover 14 and the inner surface of the outer cover 12 is achieved simply by shaking a cleaning fluid in the beaker 10, by the nozzle effect of the openings 28 and 30. The outer cover 12 is easy to place on the beaker flange 40 and can easily removed from there according to the invention whenever a pressing force, e.g. with one finger, is applied onto the flange 42 of the outer cover 12.

In case of the danger that the cover could come off due to too high an inner pressure in the mixing/drinking beaker, the lateral sealing seat 44 by virtue of the gas which had been generated (e.g. $CO_2$) by reaction of ingredients when mixing the food, will be lifted off the sealing seat 46 and so the pressure in the inner chamber will be released. This is done automatically based on the invented sealing system referred to as "pin wound round by hose". This sealing system enables especially the easy releasing of the inner as well of the outer covers 14 and 12 from their sealing seats 18 and 44, whereby the "pin" consists always of a polymer harder than that of the "hose". The hose has preferably a shore hardness of about 60 up to 95, whereas the pin is so hard that it has got approximately ten times this value with the corresponding stiffness.

This favorable behavior for the sealing and the positive bounding of the covers 12 and 14 and of the outer cover 12 with the beaker 10 (at the sealing seat 46, which is tapering in the direction of the flange 40 in the designs shown, and at the correspondingly formed sealing seat 44 which is tapering away from the flange 42), can be explained with the winding round by the chain-formed macro-molecules of the soft polymer of the "hose parts" in the outer cover 12. The winding forces are so high in case of bounded "pin-hose connections", that only by application of higher pulling forces to the handle 26 of the outer cover 12 and to the handle 50 of the inner cover 14, for example, is it possible to release the positive bounded and sealed connection; the same is true for releasing the outer cover 12 from the beaker 10 by pulling.

In the releasing process—shown for example by the cover 12 and the beaker 10 wound thereby—the "hose" will be upended by an introduced upending force into the flange 42 of the outer cover 12, and so the long molecule chains of the polymer will loose winding force around the conical seat 46 at the beaker 10 flange 40 and by this, the cover 12 can be easily released together with its also conical sealing/adhering seat 44.

In order to avoid a non-intentional releasing from a mixing and drinking beaker e.g. which is filled up, a small rim 52 is placed at the end of the sealing seat 44, which engages into a groove 54. Also in a further design, a ring 56, which is supported on the beaker 10 on the counter cone to the sealing/adhering cone 46 or in the groove 54 at the beaker flange 46, can be secured.

Taking away of ring 56 can only take place by applying a concerted force on the ring 56 and pushing it away from the counter cone or out of the groove 54—the groove has preferably a depth of only a few 1/10 millimeters.

In a preferred design, the shrinking band 56 is shrunk upon and around the beaker flange 42 of the outer cover 12 by means of a lap 58, thus pressing the fine rim 52 into the groove 54. Thereafter, when shrunk—e.g. with help of a gas flame passed around the mixing and drinking beaker—the rim 52 inserts its edge into the groove 54, winding around the beaker 10 and preventing the cover 12 from being released.

If the outer cover 12 shall be removed from the beaker 10, first the so originated form-bounded connection must be broken up. To that purpose, a predetermined breaking point 62 is provided on the shrinking band 56. Such a protection against opening is then advantageous when the mixing and drinking beaker, e.g. in edemic regions, must be kept sterile.

This invented protection can also be employed advantageously for the sale packages which are filled, and where a manipulation must be detected.

Such packages can be recycled after cleaning by the seller of such mixing and drinking beaker packages in an environment protecting and in a resource sparing (economic) way.

Attempts with e.g. kefir in the beaker 10 and a dietetic instant powder in the chamber 66 between the outer cover 12 and inner cover 14, stored hermetically against the beaker 10, have shown a good mixing capacity of the both food components after opening the inner cover and flushing the dietetic food powder (kefir) from the beaker 10.

This was to be expected, despite the relatively high viscosity of kefir and the also low solubility of the dietetic food powder, due to the invented nozzle/openings 28 and 30 between the covers 12 and 14 and the inner beaker 10 surface. Also here a mixing effect like that of an electromechanical mixer was achieved, and this with only shaking of the mixing and drinking beaker.

Now the releasing process of the inner cover 14 out of its sealing and adhering seat 18 will be explained. At the invented design, when applying a pressing force onto the almost vertical surface 64 (see FIG. 3), around the inner edge of the beaker flange 40 a torque is created about the beaker axis X, onto the horizontal cover edge 44. That means the beaker 10 in a upright position with correctly fitted covers 12 and 14 causes covers 12 and 14 to distort, like an angular lever—where the cross section surface of a cover part is thought of as a surface of an angular lever—and the cover portion (sealing seat 44 and rim 24) distorts so far that the inner cover 14 with its conical sealing and adhering surface 16, despite the peripheral rim 24 on the inner surface of the "hose" 18 gets released and will be pushed and/or falls by itself into position F over the shoulders 20a and 20b (FIG. 1) or 20c (FIG. 3). By the pressing force led through the cover surface of the outer cover 12, the outer cover 12 is removed from outside of the mixing and drinking beaker. In order to release the inner cover 14 from its seat, it is only necessary to apply a pressing force from outside of the locked mixing and drinking beaker 10 onto the outer cover 12 and there about near the handle 26 and/or onto itself. For evacuating the chamber 66, the cover consisting of the parts 12 and 14 is removed from the beaker 10, in order then to open the inner cover 14, so that the chamber 66 formed opposite to the beaker 10 by inner and outer covers 12 and 14 is thus exposed.

Refilling the chamber 66 takes place with the inner cover 14 rotated by 180° into a filling position. The chamber contents preferably has such a volume that an overfilling, by invention, is not possible.

When pressing the inner cover 14 into its seat 18, its final position there and so the correct and fluid-proof seat is indicated by a snapping noise originated by the inner cover seat 16 snapping into the groove 68 of shoulder 20c by the rim 24. The rim and groove guarantee the correct seating of the inner cover 14 in the outer cover 12; the sealing and the adhesion taking place according to the sealing and adhering system "pin wound round by hose" as applied by the inventor at the sealing and adhering seat between the outer cover 12 and the beaker 10. Also here the fine rim 52 around the outer cover seat 44 should indicate to the user of the mixing and drinking beaker the correct seating of the cover 12 with a snapping noise originated by its engaging into the groove 54.

When filling the chamber 66, preferably the inner cover 14 can be employed with its asymmetrical mould divided by the handle 50, whereby one mould part has approximately the volume of an average brimful teaspoon and the other that of an average brimful tablespoon.

Manipulation of the sale packages, e.g. removing the inner cover 14 from the seat in the outer cover 12 by joke or by fun and then leaving the sale package thus damaged in the sales room, is prevented by: the chamfers at the cover shoulders 20c, the rim 24 (FIG. 3) and the applied shrinking band 56 with its annularly actuating shrinking force. The shrinking force is inside directed onto the horizontal outer cover part 44 (FIG. 3) and effectuates an upending force onto the elastic/soft outer cover part 44 thus preventing the rim 24 around the inner surface of the lower cover 14 (a prolongation of the outer part 44 as one piece together with the outer cover) from being pushed out of the chamfers 68 (FIG. 3) by any applied violent force onto the outer cover 12. Without that, applying such force would result in a shrinking band bursting open, thus indicating the manipulation on the mixing and drinking beaker.

Such an invented new protection against not-noticing a manipulation made on a cover placed on a vessel, advantageously can be always employed where also the chamber 66 will not receive a food component. That means that this device, additionally without letting unnoticed the release of the inner cover 14, can be used in an economical way everywhere, where an unnoticed opening of a vessel with detachable cover shall be difficulted, or just made impossible.

Also by applying a shrinking band to be torn open at the cover edge for the invented sealing and adhering system "pin wound round by hose" or for any other appropriate system in a very simple and secure way, an additional tightening effect can be achieved because a one-chamber or several-chamber, e.g. labyrinth sealings are formed—according to the sealing seat in the cover and on the edge of the respective vessel and on the outforming of the invented shrinking band 56. In these sealings, e.g. an outer sealing chamber had the task to keep away dust and moisture from the package content and one or more sealing chambers could prevent a gas exchange between package and environment.

This might be the best use of the invention, because there are a lot of application possibilities and so there is possible an economic design of the shrinking band securing based on the needed amount of units and the high automation degree enabled by this for the shrinking band manufacturing with the tear-off lap and the break-off position provided for tearing away. Also development of devices and machines, which shall put on and shrink the shrinking band upon the cover and the vessel, at a high item rate might be economical and quick; an advantage because such a securing and additional sealing could help to reduce the loss of resource unities and so it could meanful for national and world economy.

Altogether the idea of a mixing and drinking beaker with the chamber in the cover and the tightening-adhering-sealing system, especially making use of the increasing velocity by shaking the locked mixing and drinking beaker, at the liquid stream narrowing places in the mixing and drinking beaker, is presented as a uniform invention, where only by co-operating of the single features the high efficiency of protection against perishing, taste protection, protection against undesired chemical compounds in the food, and thus of the mixing and drinking process itself, is achieved.

We see in the aspects just an inevitable way to develop an inventor's idea with regard to the treatment and appropriate storing of food. We see in the transposition and realization of this inventor's idea a possibility to bring help into edemic regions of the world and there where hunger and affliction rule men of this world, especially children, by this inventor's idea, on a preferably vegetarian base and so sparing resources. Also in tropical zones men can, conserving micro-nutritives and vitamins in the mixing and drinking beaker, for instance by using the dietetic powdery instant food, well dissolved, but with simple means and without expensive apparates, e.g. in skimmed milk (from skim-milk powder, generated in the mixing and drinking beaker or from the dairy), save the life of many babies.

We claim:

1. A mixing and drinking beaker for mixing a first substance with a second substance comprising:

a stiff vessel in which the first substance is located and having a longitudinal axis and a longitudinal opening at an upper end surrounded by an outer flange;

a cover for said vessel which closes said opening, said cover including an outer cover member and an inner cover member between which a chamber is formed in which the second substance is located, said outer cover member being formed of a material which is softer and more elastic than that of said vessel and including an inner seat and a first sealing wall which elastically and sealing engages said outer flange of said vessel in an inward radial direction;

said inner cover member being formed of a material which is softer and more elastic than that of said vessel and including a second sealing wall which sealingly and radially engages said seat of said outer cover member in an outward radial direction so that said chamber is sealed from said vessel, a releasing means for releasing said second sealing wall from said seat when said outer cover member is depressed in an axial direction so that said inner cover member is displaced downwards into said vessel and said chamber is open to said vessel for mixing of the first and second substances by shaking of said vessel and cover; and a band means which is positioned about said outer flange and said first sealing wall for exerting an inwardly directed radial tension force to increase the sealing engagement of said first sealing wall to said outer flange and the sealing engagement of the second sealing wall to said seat.

2. A mixing and drinking beaker as claimed in claim 1 wherein said outer cover member is more elastic and softer than said inner cover member, with both of said cover members being made from a polymer material; and wherein said vessel is made from a cross-linked high-pressure polyethylene.

3. A mixing and drinking beaker as claimed in claim 1 wherein said inner cover member is dish shaped in longitudinal cross section to form an inverted volume and includes a dividing wall which divides the volume into portions.

4. A mixing and drinking beaker as claimed in claim 1 wherein said second sealing wall of said inner cover member is sized to provide a lateral gap between said second sealing wall and said vessel when said inner cover member is displaced into said vessel, and wherein said inner cover member includes separated shoulders which extend upwardly from said second sealing wall into said chamber; such that when said vessel and cover are shaken mixing takes place at the gap and between said shoulders as the substances are accelerated therethrough.

5. A mixing and drinking beaker as claimed in claim 4 wherein said releasing means includes a radially outward directed tip at a free upper end of said shoulders and a radially inward directed holding rim above said seat of said first sealing wall such that when said inner cover member is displaced into said vessel said tips engage said holding rim to prevent further downwards displacement of said inner cover member into said vessel; and wherein said tips of said shoulders extend radially into engagement with said outer cover when said inner cover member is sealed to said outer cover member.

6. A mixing and drinking beaker as claimed in claim 5 wherein said outer cover member includes a second holding rim which is radially inward directed at a position below said first-mentioned holding rim, and wherein said second sealing wall of said inner cover member is elastically received in between said holding rims when said inner cover member is sealed to said outer cover member.

7. A mixing and drinking beaker as claimed in claim 5 wherein said vessel includes a circumferential groove in an outer surface of said outer flange and said first sealing wall includes an radially inward directed rim such that said rim of said first sealing wall of said outer cover extends opposite to said groove and in pressed therein by said band means; wherein said outer flange and said first sealing wall are conically shaped with an upwards taper.

8. A mixing and drinking beaker as claimed in claim 1 wherein said band means is a one-piece ring which is made of a heat-shrink material, said ring including a predetermined breaking point and a radially outward directed lap at said breaking point.

9. A mixing and drinking beaker as claimed in claim 1 wherein said inner seat and said first sealing wall of said outer cover member are radially opposite one another such that a gap is provided therebetween in which said outer flange of said vessel is received; wherein said second sealing wall and said inner seat are conically shaped with an upwards taper; and wherein said outer cover further includes a top depression and an upstanding handle extending from said depression.

10. A mixing and drinking beaker as claimed in claim 6 wherein said vessel includes a circumferential groove in an outer surface of said outer flange and said first sealing wall includes an radially inward directed rim such that said rim of said first sealing wall of said outer cover extends opposite to said groove and in pressed therein by said band means; wherein said outer flange and said first sealing wall are conically shaped with an upwards taper.

11. A mixing and drinking beaker as claimed in claim 10 wherein said inner seat and said first sealing wall of said outer cover member are radially opposite one another such that a gap is provided therebetween in which said outer flange of said vessel is received; wherein said second sealing wall and said inner seat are conically shaped with an upwards taper; and wherein said outer cover further includes a top depression and an upstanding handle extending from said depression.

12. A mixing and drinking beaker as claimed in claim 11 wherein said band means is a one-piece ring which is made of a heat-shrink material, said ring including a predetermined breaking point and a radially outward directed lap at said breaking point.

* * * * *